(12) United States Patent
Iida et al.

(10) Patent No.: US 7,769,479 B2
(45) Date of Patent: Aug. 3, 2010

(54) AUDIO RECORDING APPARATUS, AUDIO RECORDING METHOD AND AUDIO RECORDING PROGRAM

(75) Inventors: Kenichi Iida, Saitama (JP); Atsushi Miyaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 718 days.

(21) Appl. No.: 11/472,361

(22) Filed: Jun. 22, 2006

(65) Prior Publication Data
US 2007/0014540 A1 Jan. 18, 2007

(30) Foreign Application Priority Data
Jul. 12, 2005 (JP) ............... 2005-203692

(51) Int. Cl.
*G06F 17/00* (2006.01)
*G06F 12/00* (2006.01)
(52) U.S. Cl. ........................ 700/94; 707/205
(58) Field of Classification Search ............ 700/94; 369/53.31; 707/205; 710/29, 52, 56–58; 704/278
See application file for complete search history.

(56) References Cited

U.S. PATENT DOCUMENTS

| | | | | |
|---|---|---|---|---|
| 5,880,740 A | * | 3/1999 | Halliday et al. | 345/629 |
| 6,041,324 A | * | 3/2000 | Earl et al. | 707/9 |
| 6,078,921 A | * | 6/2000 | Kelley | 707/10 |
| 6,802,041 B1 | * | 10/2004 | Rehm | 715/201 |
| 6,871,107 B1 | * | 3/2005 | Townsend et al. | 700/94 |
| 7,162,144 B1 | * | 1/2007 | Ono et al. | 386/52 |
| 7,260,582 B2 | * | 8/2007 | Itoh | 707/102 |
| 2004/0208096 A1 | * | 10/2004 | Urazoe | 369/47.32 |
| 2005/0286863 A1 | * | 12/2005 | Howarth | 386/52 |

OTHER PUBLICATIONS

Syntrillium, "Cool Edit 2000: History", Jun. 19, 2000, archived on http://www.archive.org, http://web.archive.org/web/20000619132507/www.syntrillium.com/cooledit/history.htm, p. 1.*
Syntrillium, "Cool Edit 2000: Sound Formats", Jun. 21, 2000, archived on http://www.archive.org, http://web.archive.org/web/20000621084804/www.syntrillium.com/cooledit/formats/html, p. 1.*
Syntrillium, "Cool Edit 2000", May 11, 2000, archived on http://www.archive.org, http://web.archive.org/web/20000511193928/www.syntrillium.com/cooledit/index.html, p. 1.*
HomeRecording.com, "Live Concerts on DAT-transfer to CD-R—Home Recording", Oct. 23, 2000 to Nov. 16, 2000, world wide web forum, http://homerecording.com/bbs/showthread.php?t=17924, pp. 1-6.*

* cited by examiner

*Primary Examiner*—Vivian Chin
*Assistant Examiner*—Daniel R Sellers
(74) *Attorney, Agent, or Firm*—Oblon, Spivak, McClelland, Maier & Neustadt, L.L.P.

(57) ABSTRACT

An audio recording apparatus sequentially records encoded data in an audio file of a predetermined format. In this case, the encoded data is generated by encoding audio. The audio recording apparatus subsequently generates, while the encoded data is being recorded in the audio file, a new audio file before the size of the audio file where the encoded data is being recorded reaches an upper limit of the audio file. The audio recording apparatus then changes the place where the encoded data is recorded to the new audio file.

13 Claims, 5 Drawing Sheets

AUDIO RECORDING APPARATUS, AUDIO RECORDING METHOD AND AUDIO RECORDING PROGRAM

CROSS REFERENCES TO RELATED APPLICATIONS

The present invention contains subject matter related to Japanese Patent Application JP2005-203692 filed in the Japanese Patent Office on Jul. 12, 2005, the entire contents of which being incorporated herein by reference.

BACKGROUND OF THE INVENTION

1. Field of the Invention

The present invention relates to an audio recording apparatus, audio recording method and audio recording program, and is preferably applied to an Integrated Circuit (IC) recorder which encodes audio and then records encoded audio on a semiconductor memory, for example.

2. Description of Related Art

An IC recorder is designed to collect sound from around it through a microphone. The IC recorder transforms sound into encoded data, and then records the encoded data on a semiconductor memory. Especially, the IC recorder is designed to be light and small in size for ease of carrying. Therefore, a user can record sound in various places such as conferences and lecture meetings.

With this kind of IC recorder, the storage capacity of the semiconductor memory is limited to 128 MB for example. Therefore, the IC recorder encodes and records sound at a low bit rate such as 32 kbps (Sampling rate: 8 kHz, Quantifying bit number: 4 bit) in monaural format under the assumption that a user records mainly conversation between persons for listening to it later. In this manner, the IC recorder maintains the quality of sound so that a user can understand what the conversation was about. In addition, the IC recorder can record audio for a long time.

Some of the IC recorders connect to a personal computer through a Universal Serial Bus (USB) cable. In this case, a user can edit audio data stored in the IC recorder by controlling the personal computer (see Jpn. Pat. Laid-open Publication No. 2004-264912 [Pages 8 to 9, and FIG. 3], for example).

SUMMARY OF THE INVENTION

By the way, the IC recorder with the above configuration may have for example a semiconductor memory of 4 GB and record sound at a high bit rate such as 4.6 Mbps (Sampling rate: 96 kHz, Quantifying bit number: 24 bit) in stereo format (2 channels) so that a user can record high quality sound of voices of singers, performance of musical instruments, and the like.

In this case, in order for a user to utilize encoded data stored in the IC recorder as files through a personal computer connected to the IC recorder, the semiconductor memory of the IC recorder may be formatted in File Allocation Table 32 (FAT32) format, which is the same as that of a hard disk drive of the personal computer and the like, and then the encoded data may be stored in WAV format.

However, the size of one file is limited to up to 2 GB because of the restriction of WAV format (i.e., an upper limit on the size of a file is 2 GB). Even if the IC recorder starts to record sound on the semiconductor memory where nothing is recorded, the IC recorder closes its file to stop the recording when the size of the file reaches 2 GB in spite of enough free space (2 GB) left in the semiconductor memory. That is to say, the IC recorder has difficulty in recording audio for a long time despite the capacity of the semiconductor memory, because the size of a file is limited.

The present invention has been made in view of the above points and is intended to provide an audio recording apparatus, audio recording method and audio recording program capable of keep recording audio in spite of the restriction of file sizes.

In an embodiment of the present invention, an audio recording apparatus sequentially records encoded data in an audio file of a predetermined format. In this case, the encoded data is generated by encoding audio. The audio recording apparatus subsequently generates, while the encoded data is being recorded in the audio file, a new audio file before the size of the audio file where the encoded data is being recorded reaches an upper limit of the audio file, and then changes the place where the encoded data is recorded to the new audio file.

In this manner, while the audio recording apparatus is recording audio, the audio recording apparatus can change the place where the encoded data is recorded between the audio files. This eliminates the restriction on the upper limit of the audio file, and therefore the audio recording apparatus can continue to record audio without aborting.

In an embodiment of the present invention, while the audio recording apparatus is recording audio, the audio recording apparatus can change the place where the encoded data is recorded between the audio files. This eliminates the restriction on the upper limit of the audio file, and therefore the audio recording apparatus can continue to record audio without aborting. Thus, the audio recording apparatus, audio recording method and audio recording program according to an embodiment of the present invention can keep recording audio in spite of the restriction of file sizes.

The nature, principle and utility of the invention will become more apparent from the following detailed description when read in conjunction with the accompanying drawings in which like parts are designate by like reference numerals or characters.

DETAILED DESCRIPTION OF PREFERRED EMBODIMENTS

An embodiment of the present invention will be described in detail with reference to the accompanying drawings.

(1) Configuration of IC Recorder (1-1) Appearance Configuration

Figure 1:
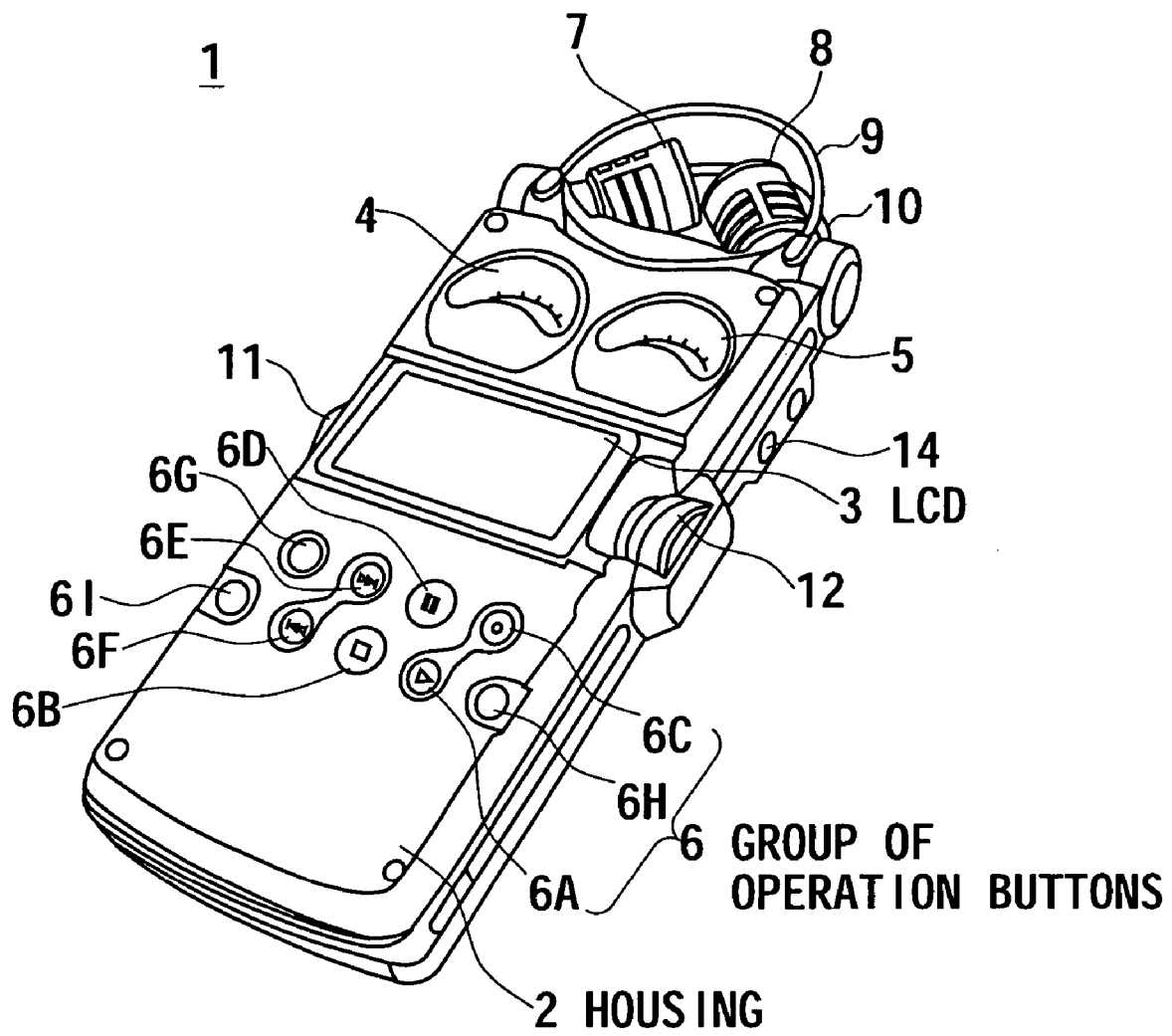
FIG. 1 is a schematic perspective view showing the appearance configuration of an IC recorder.

As shown in FIG. 1, an Integrated Circuit (IC) recorder 1 is designed to be carried to various sites by a user and then record audio (such as voices of persons and sound of musical instruments) around there.

The IC recorder 1 has a Liquid Crystal Display (LCD) 3 on the top surface of a housing 2. A Volume Unit (VU) meter 4 for a left channel and a VU meter 5 for a right channel are disposed on the upper side of the LCD 3. A group of various operation buttons 6 is disposed on the lower side of the LCD 3.

The group of operation buttons 6 includes a play button 6A, a stop button 6B, a recording button 6C, a pause button 6D, a fast forward button 6E, a rewind button 6F, a menu button 6G, a file division button 6H and a illumination button 6I. The group of operation buttons 6 waits till a user pushes them.

In addition, the IC recorder 1 has a right channel microphone 7 and a left channel microphone 8 at the top part of the housing 2. Bow-shaped covers 9 and 10 made of metal cover the right channel microphone 7 and the left channel microphone 8 to protect the right channel microphone 7 and the left channel microphone 8.

Furthermore, a volume control dial 11 is disposed on the left side face of the housing 2, and a recording level control dial 12 is disposed on the right side face of the housing 2.

The fact of the matter is that the IC recorder 1 for example encodes audio at a high bit rate such as 4.6 Mbps (Sampling rate: 96 kHz, Quantifying bit number: 24 bit) in stereo format (2 channels) and stores the encoded data as an uncompressed file of WAV format. This allows the IC recorder 1 to record high quality audio, such as voices of singers and performance of musical instrument which are desirable to be recorded in high quality. This will be described below in detail.

(1-2) Circuit Configuration

Figure 2:
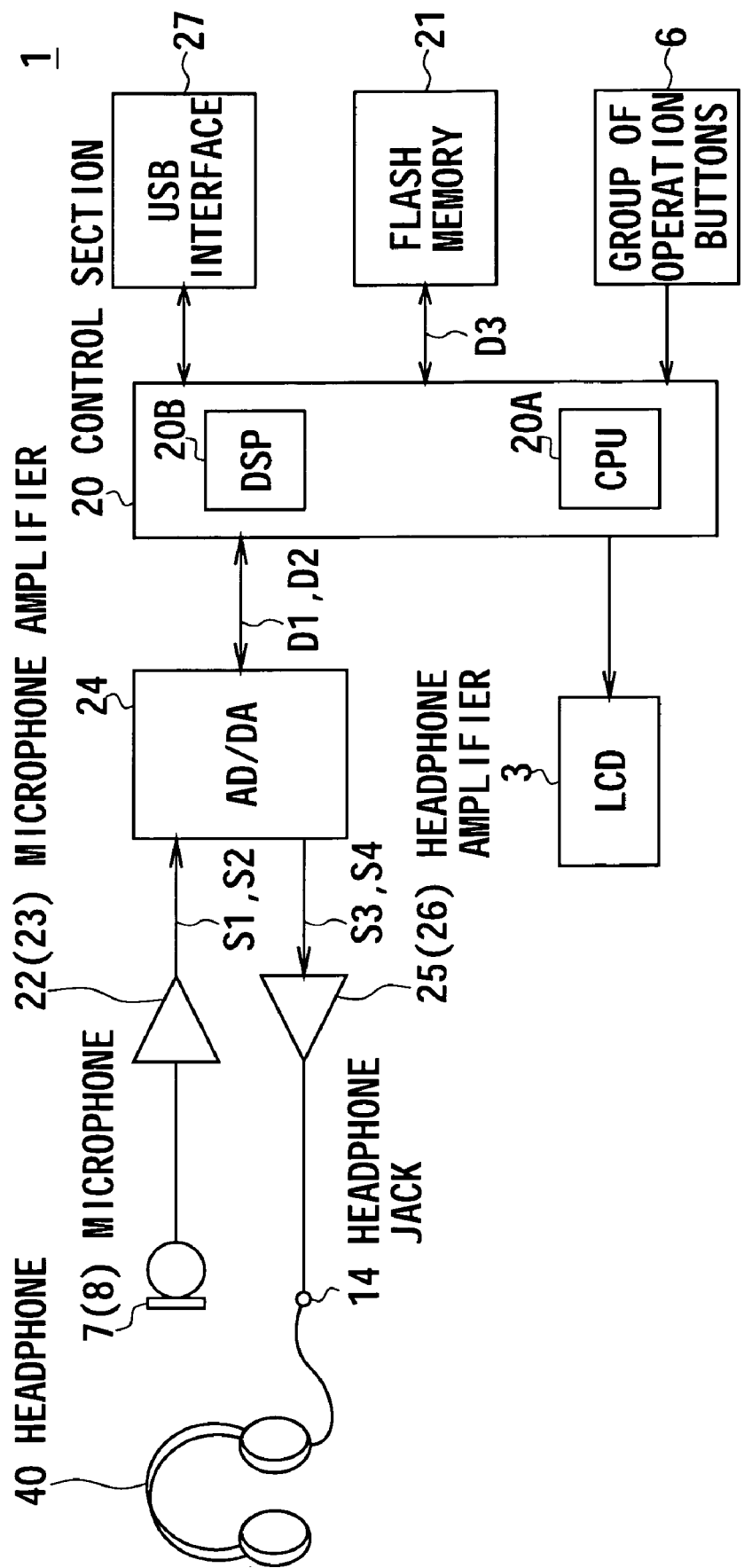
FIG. 2 is a block diagram showing the circuit configuration of the IC recorder.

As shown in FIG. 2, the IC recorder 1 has a control section 20 that takes overall control of the IC recorder 1. The control section 20 has a Central Processing Unit (CPU) 20A as a main component and other components such as a Read Only Memory (ROM) (not shown). The control section 20 reads out various programs such as a basic program and an audio recording program from the ROM and then loads these programs onto Random Access Memory (RAM) (not shown) to run these programs. Therefore, the control section 20 can provide various functions such as an audio recording process and an audio play process.

When the CPU 20A of the control section 20 detects that a user operates the buttons 6A to 6I (FIG. 1) out of the group of operation buttons 6, the CPU 20A performs process based on this operation.

For example, when the CPU 20A of the control section 20 detects that a user pushes the recording button 6C (FIG. 1) out of the group of operation buttons 6, the CPU 20A generates an audio file AF of WAV format in the flash memory 21. The name of this audio file AF is associated with date and time, and the like. And then, to write audio data, the CPU 20A opens this audio file AF.

By the way, the flash memory 21 with the capacity of 4 GB is formatted in File Allocation Table 32 (FAT 32) format. The flash memory 21 includes ten folders. The CPU 20A of the control section 20 generates the audio file AF in one of those folders selected by a user who selected it by operating the group of operation buttons 6.

The CPU 20A of the control section 20 subsequently starts to supply power from a power control section (not shown) to the right channel microphone 7 and the left channel microphone 8 to collect sound (voices of singers, sound of musical instruments and the like) around the IC recorder 1 and then transform the sound into electrical signals. The CPU 20A then controls microphone amplifiers 22 and 23 to amplify the electrical signals to a predetermined level, which generates input audio signals S1 and S2. The CPU 20A keeps supplying the input audio signals S1 and S2 to an Analog-to-Digital/Digital-to-Analog (AD/DA) conversion circuit 24.

The AD/DA conversion circuit 24 sequentially generates input audio data D1 and D2 by performing analog-to-digital conversion of the input audio signals S1 and S2, and sequentially supplies the input audio data D1 and D2 to a Digital Signal Processor (DSP) 20B of the control section 20.

The DSP 20B of the control section 20 divides the input audio data D1 and D2 for example at intervals of 0.5 sec, and performs a linear coding process for each piece of the input audio data D1 and D2. The DSP 20B then puts these 2-channel data together to generate encoded data D3 in linear Pulse Code Modulation (PCM) format. The DSP 20B sequentially supplies the encoded data D3 to the flash memory 21.

At this time, the CPU 20A of the control section 20 sequentially writes the encoded data D3 in the audio file AF of the flash memory 21. This increases the size of the audio file AF, while the CPU 20A continues performing the audio recording process.

In addition, immediately after completing the analog-to-digital conversion which generated the input audio data D1 and D2, the AD/DA conversion circuit 24 performs digital-to-analog conversion to these input audio data D1 and D2 to generate analog audio signals S3 and S4. The headphone amplifiers 25 and 26 amplify these analog audio signals S3 and S4, and then supply these analog audio signals S3 and S4 to an external headphone 40 connected to a headphone jack 14. Therefore, through the headphone 40, a user can do test listening (monitor) on the sound currently recorded.

Figure 3:
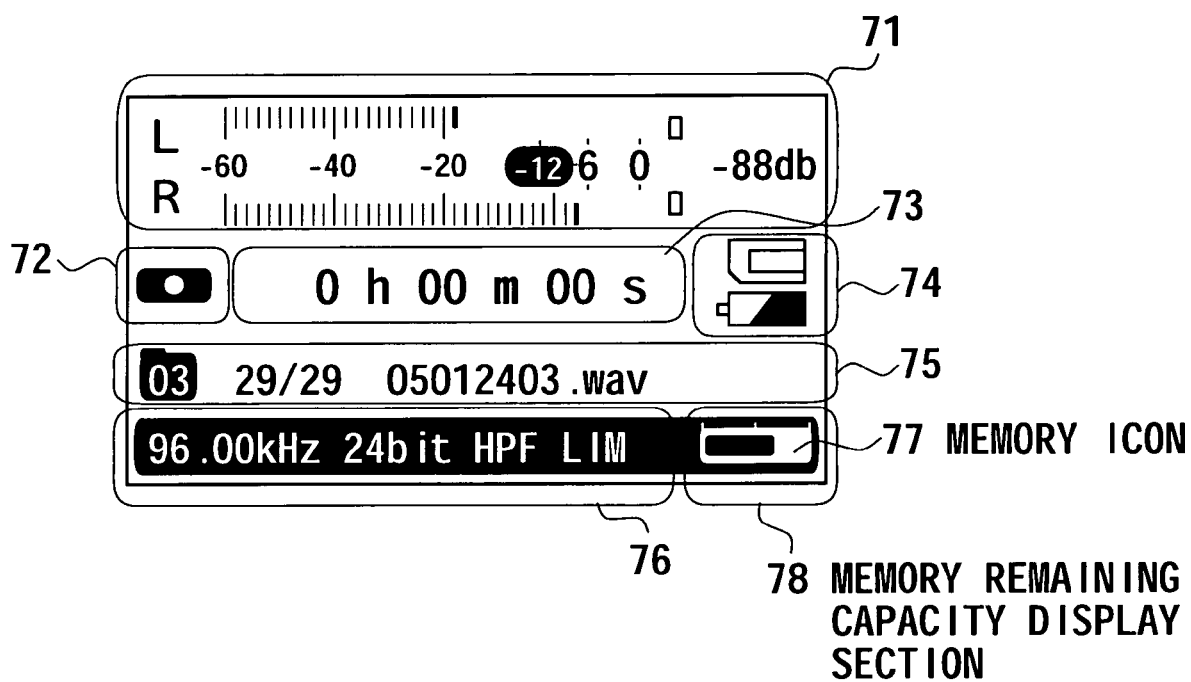
FIG. 3 is a schematic diagram showing display contents.

Furthermore, for example as shown in FIG. 3, the CPU 20A of the control section 20 displays a display screen 70 on the LCD 3. The display screen 70 includes a peak level meter display section 71, which displays loudness level of sound of the left channel and right channel; a REC mark 72, which indicates whether an audio recording process is currently being performed or not; a time display section 73, which shows a playing time, an elapsed time of recording, a remaining time available for recording, and the like; an icon display section 74, which indicates whether "MEMORY STICK (Registered Trademark of Sony Corporation)" exists or not and which also shows the charge remaining on a battery; a file display section 75, which shows a folder number ("3" in this case), the number of files ("29/29" in this case) and a file name ("05012403.wav" in this case); a detailed information display section 76, which shows a sampling rate ("96.00 kHz" in this case), a quantifying bit number ("24 bit" in this case) and the like; and a memory remaining capacity display section 78, which has a memory icon 77 changing the length of its bar based on the percentage of memory space (of the flash memory 21) used by the entire IC recorder 1. This allows a user to visually check the state of the audio recording process such as recording level and an elapsed time of recording.

By the way, when a user operates the stop button 6B (FIG. 1) out of the group of operation buttons 6, the CPU 20A of the control section 20 closes the audio file AF, and ends a series of audio recording process.

In this manner, when a user operates the recording button 6C out of the group of operation buttons 6, the IC recorder 1 transforms sound around the IC recorder 1 into electrical signals, and then sequentially performs amplification, analog-to-digital conversion, encoding process and the like to generate the encoded data D3. The IC recorder 1 then sequentially records the encoded data D3 on the audio file AF stored in the flash memory 21.

By the way, since the IC recorder 1 can be connected to a personal computer (not shown) via a USB interface 27, the IC recorder 1 is able to perform a transferring process of the audio file AF with the personal computer.

Actually, when the CPU 20A of the control section 20 detects that the USB interface 27 is connected to the personal computer through a USB cable (not shown), the CPU 20A changes its operation mode from "solo operation mode" (in which the IC recorder 1 can perform the above audio recording process) to "storage mode" such that the personal computer can utilize the flash memory 21 as an external storage of the personal computer. That is to say, the personal computer utilizes the flash memory 21 as one of drives through an Operating System (OS) of the personal computer.

Therefore, the personal computer can utilize the audio file AF stored in the flash memory 21 as a normal file of WAV format. In response to a user's operation, the personal computer can copy or move each audio file AF. In addition, the personal computer can perform an editing process using a special audio editing program and the like.

By the way, when the CPU 20A of the control section 20 detects that the USB cable (not shown) is disconnected from the USB interface 27, the CPU 20A changes its operation mode from "storage mode" to "solo operation mode" such that the IC recorder 1 can perform various processes such as the above-noted audio recording process by itself.

In this manner, when the IC recorder 1 is connected to the personal computer via the USB interface 27, the personal computer 1 detects the flash memory 21 as its external storage and utilizes the audio file AF as a normal file of WAV format.

(2) Audio Recording Process

By the way, since the IC recorder 1 has the flash memory 21 whose storage capacity is 4 GB as described above, the user may perform a long-term continuous audio recording process which uses all of the memory space of the flash memory 21.

However, according to WAV format which is utilized for the audio file AF, the size of a file is limited to up to 2 GB (i.e., an upper limit on the size of a file is 2 GB). Therefore, the IC recorder 1 has difficulty in writing the encoded data D3 of more than 2 GB in one audio file AF.

By the way, if the IC recorder 1 generates the audio file AF of more than 2 GB, the personal computer connected to the IC recorder 1 has difficulty in utilizing this audio file AF as a normal file of WAV format because of a problem of compatibility.

Accordingly, in a case in which the IC recorder 1 performs a long-term continuous audio recording process (which is to say the IC recorder 1 writes the encoded data D3 of more than 2 GB in the flash memory 21), the IC recorder 1 generates, immediately before the size of the audio file AF (This audio file AF will be referred to as an audio file AF1) exceeds 2 GB, a new audio file AF (This audio file AF will be referred to as an audio file AF2), and then changes the place where the encoded data D3 is written from the audio file AF1 to the audio file AF2. In this manner, the IC recorder 1 writes the encoded data D3 in two audio files AF.

By the way, the control section 20 starts generating the audio file AF2 when the size of the audio file AF1 reaches 1.96 GB which is just before 2 GB, and then changes the place where the encoded data D3 is written to the audio file AF2 immediately before the size of the audio file AF1 reaches 2 GB. This is because it takes time to generate the audio file AF2. That increases the efficiency of the usage of the audio files AF and prevents the audio recording process from being stopped.

In addition, when the IC recorder 1 changes the place where the encoded data D3 is written from the audio file AF1 to the audio file AF2, the IC recorder 1 does not change the file name displayed on the file display section 75 of the display screen 70 (FIG. 3), in spite of the fact that the file name of the audio file AF1 is different from that of the audio file AF2. In this manner, the audio is transparently recorded on two audio files AF.

With reference to a flowchart shown in FIG. 4, the audio recording process in which sound around the IC recorder 1 is recorded will be described below.

When the control section 20 of the IC recorder 1 detects that a user pushes the recording button 6C (FIG. 1) out of the group of operation buttons 6, the control section 20 starts a procedure RT1 of the audio recording process and then proceeds to step SP1. At step SP1, the control section 20 generates the audio file AF1 in a folder currently selected in the flash memory 21. The control section 20 subsequently opens the audio file AF1 so that the encoded data D3 can be written in the audio file AF1, and then proceeds to next step SP2.

At step SP2, the control section 20 determines whether or not the current size of the audio file AF1 reaches 1.96 GB which is just before 2 GB. Negative result at step SP2 means that the audio file AF1 still has an available space for writing the encoded data D3. In this case, the control section 20 proceeds to next step SP4.

On the other hand, affirmative result at step SP2 means that the audio file AF1 does not have space for writing the encoded data D3. In this case, the control section 20 proceeds to next step SP3.

At step SP3, the control section 20 closes the audio file AF1 in the flash memory 21, and at the same time generates a new audio file AF2 in the same folder where the audio file AF1 is stored, and then opens the audio file AF2. The control section 20 subsequently changes where the encoded data D3 is written from the audio file AF1 to the audio file AF2, and then proceeds to next step SP4 without changing the file name displayed on the file display section 75 of the display screen 70 (FIG. 3).

At step SP4, the control section 20 determines whether or not there is free space on the flash memory 21. Affirmative result at step SP4 means that the flash memory 21 still has enough space for writing the encoded data D3, which is to say the control section 20 can continue the audio recording process. In this case, the control section 20 proceeds to next step SP5.

At step SP5, the control section 20 writes the encoded data D3 of a certain period of time (0.5 sec in this case) in the currently opened audio file AF (the audio file AF1 or the audio file AF2), and then proceeds to next step SP6.

At step SP6, the control section 20 determines whether or not the stop button 6B (FIG. 1) in the group of operation buttons 6 is pushed. Negative result at step SP6 means that a user still has an intention that he/she wants to keep doing the audio recording process. In this case, the control section 20 returns to step SP2, and repeatedly performs a series of process of writing the encoded data D3 in the audio files AF.

On the other hand, negative result at step SP4 means that the encoded data D3 of 4 GB has been already written in the flash memory 21 and therefore the flash memory 21 does not have enough space for writing other encoded data D3. In this case, the control section 20 proceeds to next step SP7.

Affirmative result at step SP6 means that the user shows his/her intention that he/she wants to end the audio recording. In this case, the control section 20 proceeds to next step SP7.

At step SP7, the control section 20 closes the currently opened audio file AF, and controls the power control section (not shown) to stop supplying power to the right channel microphone 7 and the left channel microphone 8 (FIG. 2). In addition, the control section 20 ends processes on the microphone amplifiers 22 and 23, the AD/DA conversion circuit 24, the DSP 20B of the control section 20 and the like, and then proceeds to next step SP8 to end the procedure RT1 of the audio recording process.

(3) Display of Audio File on Personal Computer

By the way, in a case in which the continuous audio recording process records the encoded data D3 of more than 2 GB, the process writes the encoded data D3 in the audio file AF2 after writing the encoded data D3 in the audio file AF1. When the place where the encoded data D3 is written is changed from the audio file AF1 to the audio file AF2, the file name ("05012403.wav" in this case) displayed on the file display section 75 of the display screen 70 (FIG. 3) is not changed.

That is to say, the IC recorder 1 modifies the file name of the audio file AF in the flash memory 21 before displaying it to the user.

On the other hand, when the IC recorder 1 is connected to the personal computer (not shown) through the USB cable (not shown) as described above, the IC recorder 1 changes its operation mode to "storage mode". Therefore, the personal computer detects the flash memory 21 as its external storage drive.

Figure 5:
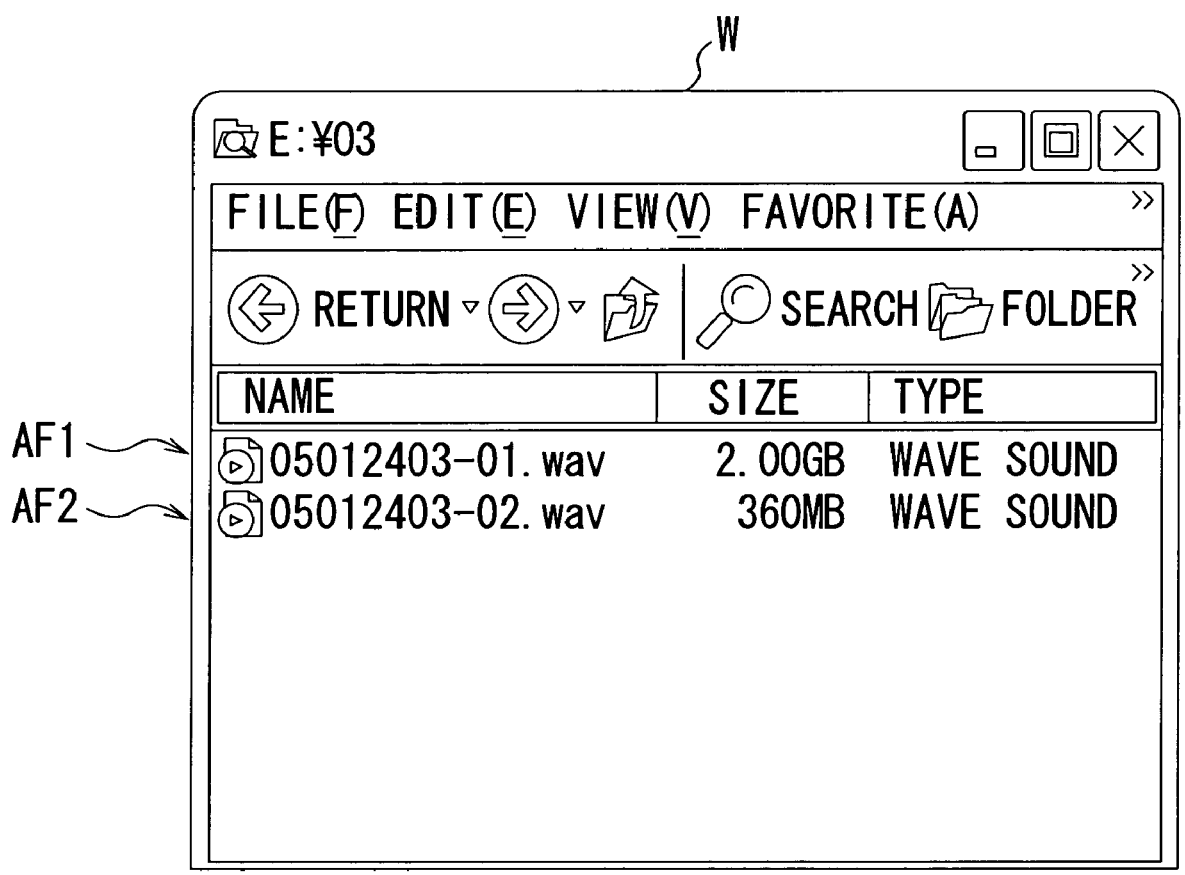
FIG. 5 is a schematic diagram showing a way to display audio files on a personal computer.

In this case, the IC recorder 1 notifies the personal computer of the file names of the audio files AF in the flash memory 21 without modifying these names. Therefore, as shown in FIG. 5 for example, the personal computer recognizes original unique names of the audio file AF1 ("05012403-01.wav" in this case) and the audio file AF2 ("05012403-02.wav" in this case) stored in the flash memory 21, and displays these names in a window W on a display screen of the personal computer.

(4) Operation and Effect

When a user pushes the recording button 6C (FIG. 1) out of the group of operation buttons 6, the IC recorder 1 with the above configuration generates the audio file AF1 of WAV format in the flash memory 21 and sequentially writes the encoded data D3, which is generated by encoding audio, in the audio file AF1.

Immediately before the size of the audio file AF1 exceeds 2 GB, the IC recorder 1 generates the audio file AF2, and then changes the place where the encoded data D3 is written to the audio file AF2 to continue the audio recording process.

Therefore, the IC recorder 1 can change where the encoded data D3 is written between the audio file AF1 and the audio file AF2, each of which has a capacity of 2 GB. Accordingly, the IC recorder 1 can continue the audio recording process till the IC recorder 1 runs out of storage space of the flash memory 21, in spite of the fact that the size of a file is limited to up to 2 GB on WAV format.

In this case, the IC recorder 1 does not generate files of more than 2 GB. This ensures the compatibility of file format. Therefore, external devices, such as personal computers, can utilize the audio file AF1 and the audio file AF2 as a normal file of WAV format. In addition, based on a general audio editing program, the personal computer can provide a user with a function that enables a user to perform audio editing process. Compared to a case in which a special file format is applied without thinking of the compatibility, this IC recorder 1 increases its usability.

The IC recorder 1 does not change the file name displayed on the file display section 75 of the display screen 70 (FIG. 3). Therefore, a user does not recognize that audio is recorded on two audio files AF1 and AF2 due to the restriction of WAV format which limits the size of a file to 2 GB. The IC recorder 1 can perform the audio recording process as if one process generates one audio file AF.

In addition, when the IC recorder 1 is connected to an external device such as a personal computer, the IC recorder 1 notifies the external device of the original names of the audio files AF stored in the flash memory 21. Therefore, a user who wants to do a management process or editing process of the audio files AF can correctly understand their original file names and the fact that the audio is recorded on two audio files AF1 and AF2.

In a case in which the IC recorder 1 with the above configuration sequentially writes the encoded data D3, which is generated by encoding audio, in the audio file AF1, the IC recorder 1 generates the audio file AF2 immediately before the size of the audio file AF1 exceeds 2 GB, and changes the place where the encoded data D3 is written to the audio file AF2 to continue the audio recording process. Accordingly, the IC recorder 1 can continue the audio recording process till the IC recorder 1 runs out of storage space of the flash memory 21, in spite of the fact that the size of a file is limited to up to 2 GB on WAV format. Thus, the IC recorder 1 can keep recording audio in spite of the restriction of file sizes.

(5) Other Embodiments

In the above-noted embodiments, when the place where the encoded data D3 is written is changed from the audio file AF1 to the audio file AF2, the file name displayed on the file display section 75 of the display screen 70 (FIG. 3) is not changed. However, the present invention is not limited to this. The file name displayed on the file display section 75 may be changed to notify a user of the fact that the place where the encoded data D3 is written was changed from the audio file AF1 to the audio file AF2 in a positive way.

In addition, in the above-noted embodiments, when the IC recorder 1 is connected to the personal computer (not shown), the original file names of the audio files AF1 and AF2 stored in the flash memory 21 are individually displayed on the display screen. However, the present invention is not limited to this. For example, the personal computer may run a special file operation program, which is dedicated to the IC recorder 1, to deal with the audio files AF1 and AF2 as one audio file on the file operation program.

In this case, the IC recorder 1 can be connected to other external devices, such as a special audio editing device, through a USB cable as well as personal computers.

Furthermore, in the above-noted embodiments, since the storage capacity of the flash memory 21 is 4 GB and a file of WAV format is limited to up to 2 GB, the encoded data D3 is divided into two data which are then written in the two audio files AF. However, the present invention is not limited to this. For example, in a case in which the storage capacity of the flash memory 21 is 8 GB or 16 GB, the encoded data D3 may be divided into four or eight data of 2 GB which are then written in the four or eight audio files AF.

Furthermore, in the above-noted embodiments, the audio files AF are generated in WAV format, and the encoded data D3 are written in the audio files AF. However, the present invention is not limited to this. The encoded data D3 may be written in files of various formats such MP3 and ATRAC3. In addition, these files can be compressed.

Furthermore, in the above-noted embodiments, the size of the audio file AF is limited to up to 2 GB. However, the present invention is not limited to this. The size of the audio file AF may be limited to up to 1 GB, 4 GB or the like.

Furthermore, in the above-noted embodiments, the audio file AF is divided into files of 2 GB due to the restriction that limits the size of a file of a certain file format (WAV format in this case) to up to 2 GB. However, the present invention is not limited to this. The audio file AF may be divided into files of 1 GB due to the restriction associated with the hardware of the IC recorder 1. In this manner, the audio file AF may be divided in to files due to various restrictions.

Furthermore, in the above-noted embodiments, the IC recorder 1, which generates the audio files AF in the flash memory 21 and then writes the encoded data D3, is applied. However, the present invention is not limited to this. For example, a hard disk recorder, which generates the audio files AF in a hard disk drive and then writes the encoded data D3, may be applied to an embodiment of the present invention. In this manner, various kinds of audio recording apparatus, which encode audio and then record in the audio files, may be applied to an embodiment of the present invention.

Figure 4:
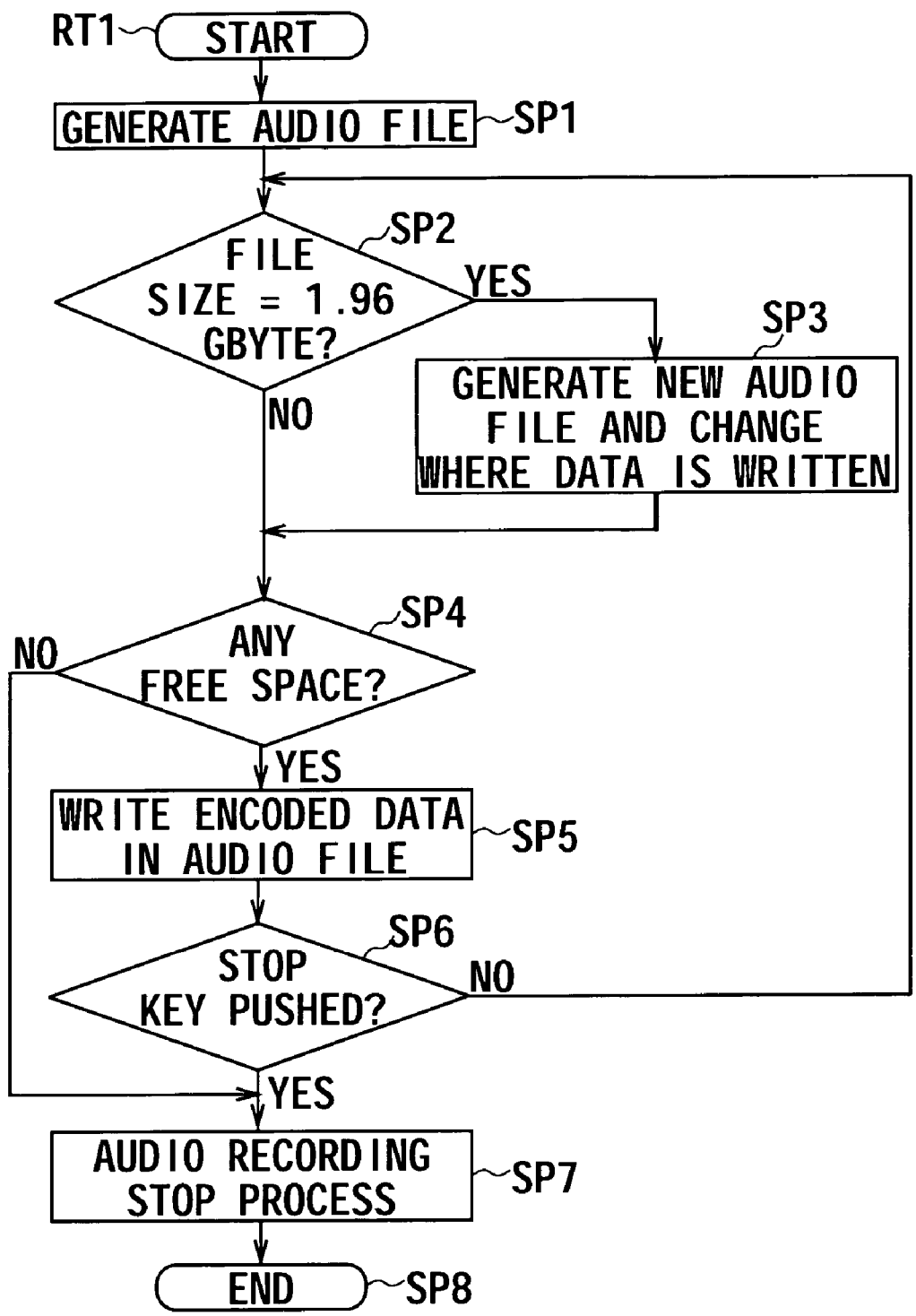
FIG. 4 is a schematic diagram showing the procedure of an audio recording process.

Furthermore, in the above-noted embodiments, the IC recorder 1 follows the audio recording program, which has been previously stored in the ROM (not shown) of the control section 20, to perform the procedure RT1 of the audio recording process (FIG. 4). However, the present invention is not limited to this. For example, this audio recording program may be stored in other storage media such as the flash memory 21. This audio recording program may be also stored in removable storage media such as "MEMORY STICK (Registered Trademark of Sony Corporation)". In this case, the IC recorder 1 reads out the audio recording program through a slot of the "MEMORY STICK (Registered Trademark of Sony Corporation)" to run this program. Alternatively, the IC recorder 1 may acquire the audio recording program from a personal computer (not shown) through the USB interface 27. In this case, to restore the audio recording program, the IC recorder 1 may uncompress compressed data or run an install program.

Furthermore, in the above-noted embodiments, the IC recorder 1, which is equivalent to audio recording apparatus, includes the AD/DA conversion circuit 24, which is equivalent to recording means; the DSP 20B, which is also equivalent to the recording means; the flash memory 21, which is also equivalent to the recording means; and the CPU 20A, which is equivalent to control means. However, the present invention is not limited to this. The audio recording apparatus may include various circuit components, which are equivalent to the recording means and the control means.

The audio recording apparatus, audio recording method and audio recording program according to an embodiment of the present invention can be applied to various audio recording devices which encode audio and record it in files.

It should be understood by those skilled in the art that various modifications, combinations, sub-combinations and alterations may occur depending on design requirements and other factors insofar as they are within the scope of the appended claims or the equivalents thereof.

What is claimed is:

1. An audio recording apparatus comprising:
   recording means for sequentially recording encoded data in an audio file of a predetermined format, said encoded data being generated by encoding audio, said predetermined format having an upper limit on file size;
   display means for displaying a file name of said audio file: and
   control means for generating, while said encoded data is being recorded in said audio file, a new audio file before a size of said audio file where said encoded data is being recorded reaches the upper limit on file size, and then changing a place where additional encoded data of said encoded data is recorded to said new audio file, said control means comparing a size of the encoded data recorded in said audio file to a threshold set at a predetermined amount below said upper limit of said file size, the control means maintaining the file name of said audio file displayed on said display means even after the additional encoded data is recorded to said new audio file, and said control means controls said display means to display the file name of said audio file as if said control means keeps recording said encoded data in one audio file.

2. The audio recording apparatus according to claim 1, further comprising:
   connecting means for connecting to an external device capable of recognizing said audio file, wherein
   said control means forces said external device to recognize said audio file and said new audio file as individual original audio files when said control means detects that said external device is connected through said connecting means.

3. The audio recording apparatus according to claim 1, wherein said recording means generates said encoded data by encoding said audio without compressing said audio.

4. The audio recording apparatus according to claim 3, wherein said recording means records said encoded data in an audio file of WAV format.

5. An audio recording method comprising:
   sequentially recording encoded data in an audio file of a predetermined format, said encoded data being generated by encoding audio, said predetermined format having an upper limit on file size;
   displaying a file name of said audio file;
   generating, while said encoded data is being recorded in said audio file, a new audio file before a size of said audio file where said encoded data is being recorded reaches the upper limit on file size, and then changing a place where additional encoded data of said encoded data is recorded to said new audio file, said generating includes comparing a size of the encoded data recorded in said audio file to a threshold set at a predetermined amount below said upper limit of said file size; and
   maintaining display of the file name of said audio file even after the additional encoded data is recorded to said new audio file as if said encoded data is all recorded in one audio file.

6. The method of claim 5, further comprising:
   connecting to an external device capable of recognizing said audio file,
   wherein said generating forces said external device to recognize said audio file and said new audio file as individual original audio files when said external device is connected in said connecting.

7. The method of claim 5, wherein said predetermined format being a WAV format.

8. A computer-readable medium having encoded therein an audio recording program with instructions that when executed by a processor cause an audio recording apparatus to perform a method comprising:
   sequentially recording encoded data in an audio file of a predetermined format, said encoded data being generated by encoding audio, said predetermined format having an upper limit on file size;
   displaying a file name of said audio file;
   generating, while said encoded data is being recorded in said audio file, a new audio file before a size of said audio file where said encoded data is being recorded reaches the upper limit on file size, and then changing a place where additional encoded data of said encoded data is recorded to said new audio file, said generating includes comparing a size of the encoded data recorded in said audio file to a threshold set at a predetermined amount below said upper limit of said file size; and maintaining display of the file name of said audio file even after the additional encoded data is recorded to said new audio file as if said encoded data is all recorded in one audio file.

9. The computer-readable medium of claim 8, further comprising:

connecting to an external device capable of recognizing said audio file, wherein said control step forces said external device to recognize said audio file and said new audio file as individual original audio files when said external device is connected in said connecting step.

10. The computer-readable medium of claim 8, wherein said predetermined format is a WAV format.

11. An audio recording apparatus comprising:

a recording section configured to sequentially record encoded data in an audio file of a predetermined format, said encoded data being generated by encoding audio, said predetermined format having an upper limit on file size;

a display configured to display a file name of said audio file; and a control section configured to generate, while said encoded data is being recorded in said audio file, a new audio file before a size of said audio file where said encoded data is being recorded reaches the upper limit on file size, and then changing a place where additional encoded data of said encoded data is recorded to said new audio file, said control section comparing a size of the encoded data recorded in said audio file to a threshold set at a predetermined amount below said upper limit of said file size, the control section configured to maintain the file name of said audio file displayed on said display even after the additional encoded data is recorded to said new audio file, and said control section configured to control said display to display the file name of said audio file as if said control section keeps recording said encoded data in one audio file.

12. The apparatus of claim 11, further comprising:

a connector configured to connect to an external device capable of recognizing said audio file, wherein, said control section forces said external device to recognize said audio file and said new audio file as individual original audio files when the control section detects that said external device is connected through said connector.

13. The apparatus of claim 11, wherein said predetermined format is a WAV format.

* * * * *